United States Patent
Bergin

(10) Patent No.: US 10,499,771 B2
(45) Date of Patent: Dec. 10, 2019

(54) MULTI-FUNCTION TONGS

(71) Applicant: Kieran John Bergin, Montclair, NJ (US)

(72) Inventor: Kieran John Bergin, Montclair, NJ (US)

(73) Assignee: KIERAN BERGIN INC., Montclair, NJ (US)

( * ) Notice: Subject to any disclaimer, the term of this patent is extended or adjusted under 35 U.S.C. 154(b) by 0 days.

(21) Appl. No.: 16/013,866

(22) Filed: Jun. 20, 2018

(65) Prior Publication Data

US 2018/0360273 A1 Dec. 20, 2018

Related U.S. Application Data

(60) Provisional application No. 62/522,283, filed on Jun. 20, 2017.

(51) Int. Cl.
 *A47J 43/28* (2006.01)

(52) U.S. Cl.
 CPC .......... *A47J 43/283* (2013.01); *A47J 43/288* (2013.01)

(58) Field of Classification Search
 CPC .......... A47J 43/283; A47J 43/288; B25B 9/02
 USPC ...................................... 294/99.2
 See application file for complete search history.

(56) References Cited

U.S. PATENT DOCUMENTS

| 3,804,320 | A | * | 4/1974 | Vandermark | B23K 3/0476 |
| | | | | | 219/230 |
| 6,155,620 | A | * | 12/2000 | Armstrong | A01B 1/00 |
| | | | | | 15/105 |
| 7,045,744 | B2 | * | 5/2006 | Oh | A45D 1/10 |
| | | | | | 219/225 |
| 7,793,389 | B1 | * | 9/2010 | Michnik | A47J 45/072 |
| | | | | | 16/422 |
| 2011/0185550 | A1 | * | 8/2011 | Yu | B25B 9/02 |
| | | | | | 29/283 |

FOREIGN PATENT DOCUMENTS

| DE | 102009034614 | * | 11/2010 |
| EP | 2177961 A1 | * | 4/2010 |

\* cited by examiner

*Primary Examiner* — Stephen A Vu
(74) *Attorney, Agent, or Firm* — Kali-Law Group, P.C.

(57) ABSTRACT

Multi-function tongs are presented including: a pair of arms mechanically hinged along a proximal end; a pair of rotatable paddles each rotatably coupled with each of the pair of arms along a distal end; a pair of rotatable gears each rotatably coupled with each of the pair of rotatable paddles and with each of the pair of arms, where the pair of rotatable gears mesh when the multi-function tongs are in the closed position; and a pair of levers mechanically coupled with each of the pair of rotatable gears, the pair of levers extending outwardly from each of the pair of arms. In some embodiments, multi-function tongs further include: a tongs lock disposed along the proximal end to lock the multi-function tongs in a closed position.

13 Claims, 6 Drawing Sheets

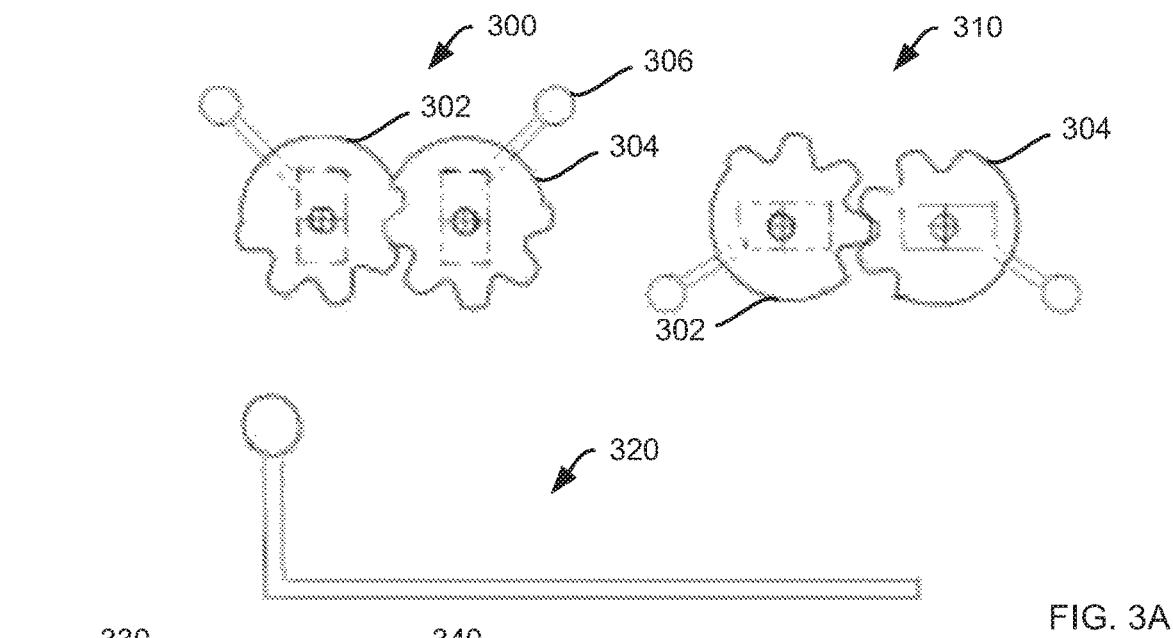
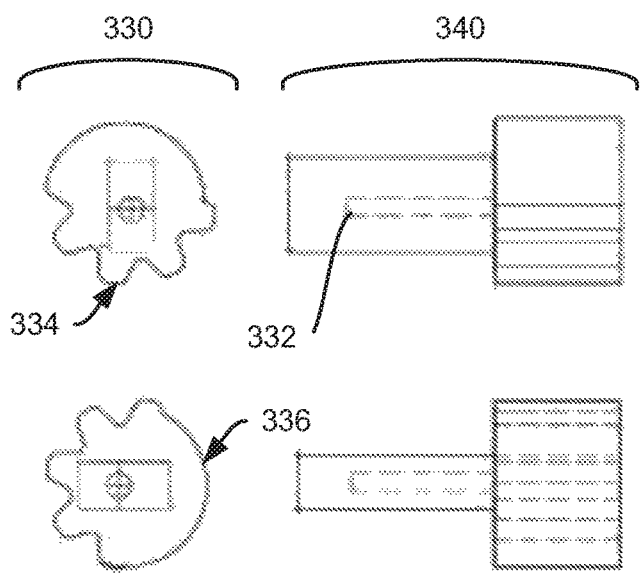
FIG. 3A
FIG. 3B
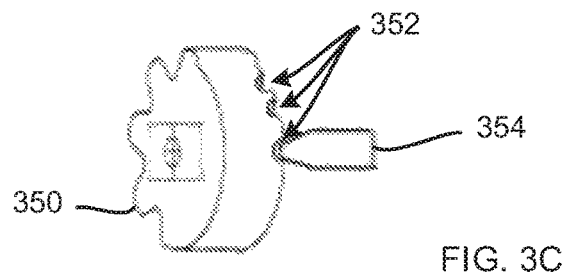
FIG. 3C

MULTI-FUNCTION TONGS

BACKGROUND

The function of tongs is to grab and transport items by means of compressing the item between two opposing surfaces that are generally hinged together at a single point. Tongs are useful in cooking as a means of manipulating food items to and from a cooking surface. However, tongs have a limited capacity to gather some items efficiently due to the lack of surface area. In some cases, it may be difficult or impossible to grab a large item without breakage due to lack of adequate support. In some examples, tongs that have been manufactured with larger contact surface areas for grabbing items. These examples may be cumbersome and lack the delicate control needed for manipulating food while cooking.

As such multi-function tongs are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, multi-function tongs are presented including: a pair of arms mechanically hinged along a proximal end; a pair of rotatable paddles each rotatably coupled with each of the pair of arms along a distal end; a pair of rotatable gears each rotatably coupled with each of the pair of rotatable paddles and with each of the pair of arms, where the pair of rotatable gears mesh when the multi-function tongs are in the closed position; and a pair of levers mechanically coupled with each of the pair of rotatable gears, the pair of levers extending outwardly from each of the pair of arms. In some embodiments, multi-function tongs further include: a tongs lock disposed along the proximal end to lock the multi-function tongs in a closed position. In some embodiments, multi-function tongs further include: a tongs spring disposed along the proximal end to provide opening force to the pair of arms. In some embodiments, multi-function tongs further include: on each of the pair of rotatable gears a number of indents each corresponding with a position; and a pair of pin stops that engage the number of indents for each of the pair of rotatable gears. In some embodiments, the position is selected from the group consisting of: a tong position, a ladle position, and a spatula position. In some embodiments, the pair of rotatable gears are manufactured from a polymeric material. In some embodiments, multi-function tongs further include: a toothed portion along an outer edge of the rotatable gear; and a smooth portion along the outer edge of the rotatable gear.

In other embodiments, methods of utilizing multi-function tongs are presented including: providing a multi-function tongs, the multi-function tongs including: a pair of arms mechanically hinged along a proximal end; a pair of rotatable paddles each rotatably coupled with each of the pair of arms along a distal end; a tongs lock disposed along the proximal end to lock the multi-function tongs in a closed position; a tongs spring disposed along the proximal end to provide opening force to the pair of arms; a pair of rotatable gears each rotatably coupled with each of the pair of rotatable paddles and with each of the pair of arms, where the pair of rotatable gears mesh when the multi-function tongs are in the closed position; and a pair of levers mechanically coupled with each of the pair of rotatable gears, the pair of levers extending outwardly from each of the pair of arms; closing the multi-function tongs; locking the multi-function tongs with the tongs lock; and rotating the multi-function tongs to a ladle position. In some embodiments, methods further include: rotating the multi-function tongs to a spatula position. In some embodiments, methods further include: rotating the multi-function tongs to a tongs position; and unlocking the multi-function tongs.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A-C are illustrative representations of rotatable gears for multi-function tongs in accordance with embodiments of the present invention;

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Figure 1:
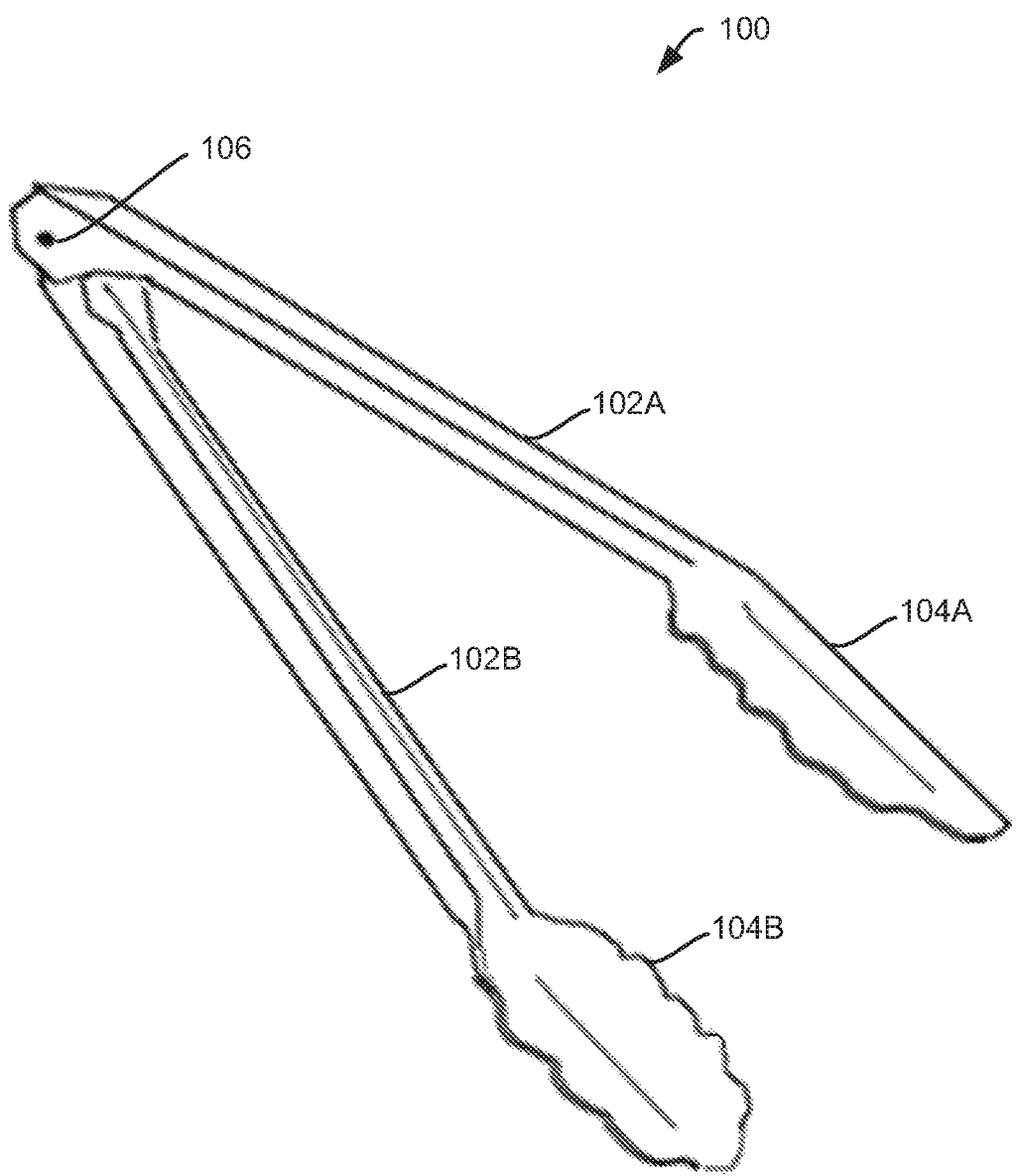
FIG. 1 is a prior art representation of tongs.

FIG. 1 is a prior art representation of tongs 100. Tongs are commonly utilized as a cooking utensil such as for gathering leafy vegetables or picking up a small food item. Due to the small surface area tongs have a limited ability to grab, lift or gather a variety of different food items. As illustrated, tongs 100 typically include arms 102A and 102B each having a paddle 104A and 104B respectively. Tongs 100 includes pivot point 106 that may or may not include a locking mechanism. In use, tongs are held by a single hand. The arms are spring loaded to resist hand pressure. Tongs are fairly useful but are necessarily limited in application.

Figure 2A:
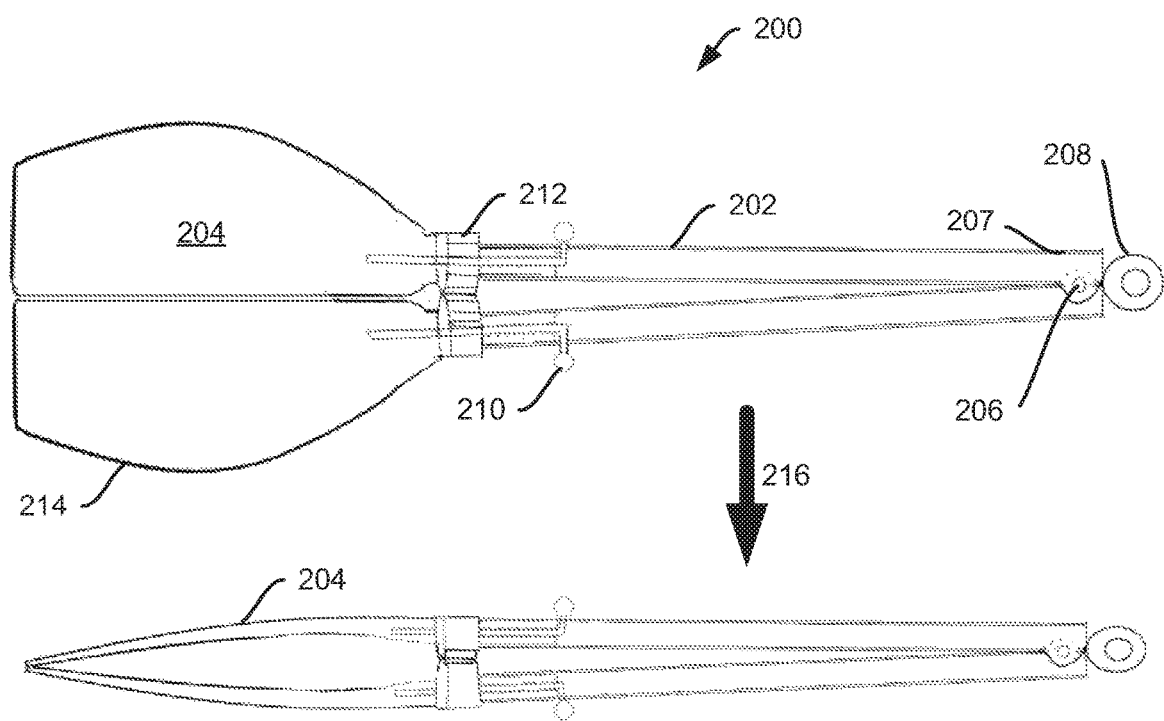
FIGS. 2A-2B are illustrative representations of multi-function tongs in accordance with embodiments of the present invention.
Figure 2B:
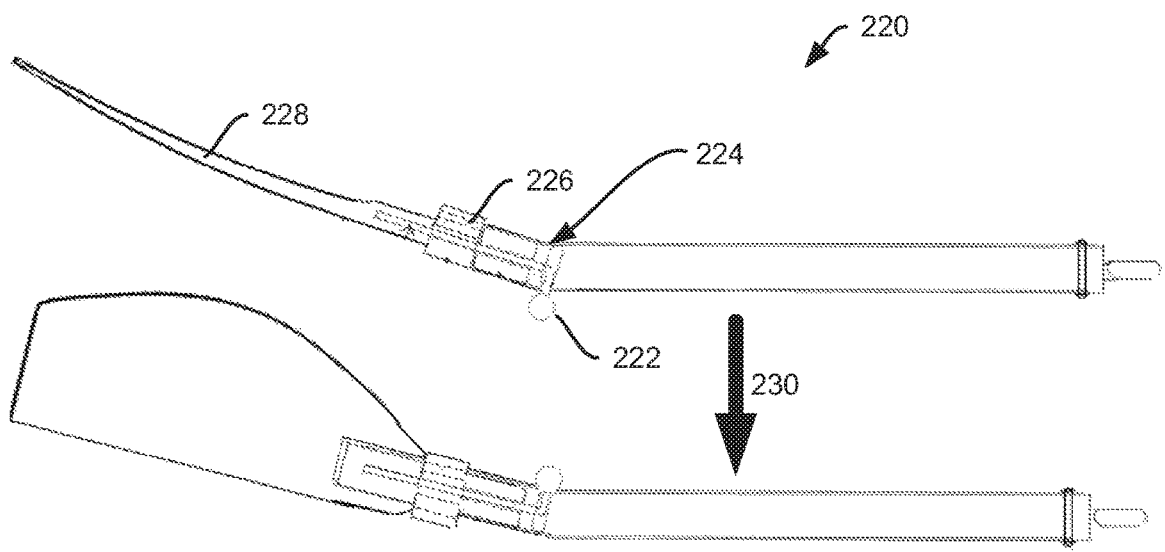

FIGS. 2A-2B are illustrative representations of multi-function tongs in accordance with embodiments of the present invention. In particular, FIG. 2A illustrates multi-function tongs 200 in top view while FIG. 2B illustrates multi-function tongs 210 in side view. Referring to FIG. 2A, multi-function tongs 200 includes a pair of arms 202 mechanically hinged 206 along a proximal end. Also illustrated is tongs lock 208 disposed along the proximal end to lock the multi-function tongs in a closed position. Further disposed along the proximal end is tongs spring 207 disposed to provide opening force to the pair of arms. Although tongs spring is not specifically illustrated, one skilled in the art will readily recognize the positioning and configuration of such an element. Further illustrated are a pair of rotatable paddles 204 that are rotatably coupled with arms 202. In some embodiments, rotatable paddle 204 may include a lobed edge 214. The lobed edge illustrated is a single lobe, however, one skilled in the art will recognize that several lobes (or scallops) may be utilized along edge 214 without limitation. In operation, rotatable paddles may be rotated to any of three positions, namely, a tong position, a ladle position, and a spatula position. These positions will be discussed in further detail below for FIGS. 5 and 6.

In order to rotate the rotatable paddles, a pair of rotatable gears 212 are coupled with the rotatable paddles. Rotation is accomplished using a pair of levers 210 that extend outwardly from the arms and are mechanically coupled with the rotating gears. Notably, the rotatable gears mesh when multi-function tongs are in the closed position as shown. Rotatable gears will be discussed in further detail below for FIGS. 3A-3C. When levers 210 are rotated, rotatable paddles 204 may be rotated by as much as 90 degrees as indicated by arrow 216. Referring to FIG. 2B, in some embodiments, bend 224 positioned between the proximal end and rotatable gear 226 may be useful in providing a more ergonomically desirable configuration for multi-function tong 220. As above, as levers 222 are rotated, rotatable paddles 228 may be rotated by as much as 90 degrees as indicated by arrow 230.

FIGS. 3A-C are illustrative representations of rotatable gears for multi-function tongs in accordance with embodiments of the present invention. In particular, FIG. 3A illustrates rotatable gears 302 and 304 in initial position 300 and in rotated position 310. Rotation is accomplished using lever 306, which is also illustrated in side view 320. In some embodiments rotatable gears may be manufactured from a polymeric material selected for durability and cleanability. Rotatable gears are configured to provide at least 90 degrees of rotation. Referring to FIG. 3B, rotatable gears are presented in front view 330 and side view 340. In addition, as illustrated, rotatable gear embodiments include both toothed portion 334 along the outer edge of the rotatable gear and smooth portion 336 along outer edge of the rotatable gear. These views are presented for clarity in understanding embodiments disclosed herein and should not be construed as limiting with respect to dimension such as height and width. It may be seen that rotatable gears include hollow shaft 332 to receive a lever, which may be bonded to rotatable gears in any manner known in the art without limitation. Referring to FIG. 3C, rotatable gear 350 includes a number of indents 352 along with pin stop 354 that provide positive stops at each of three positions, namely, a tong position, a ladle position, and a spatula position.

Figure 4:
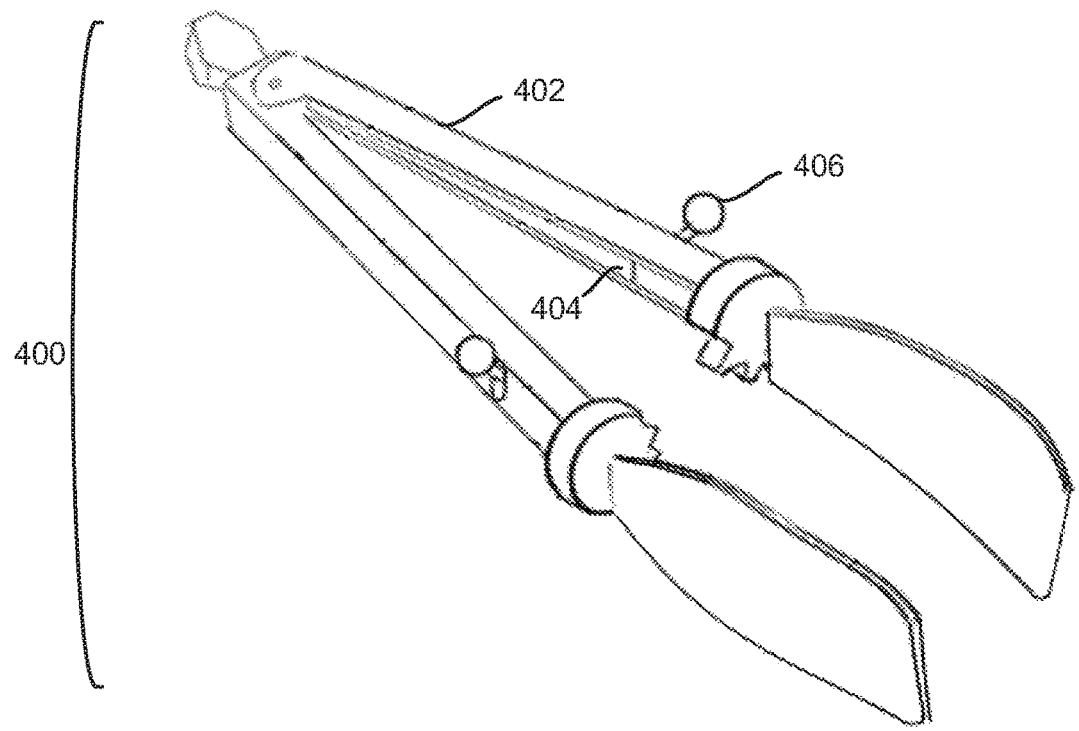
FIG. 4 is an illustrative representation of multi-function tongs in accordance with embodiments of the present invention.
Figure 4:
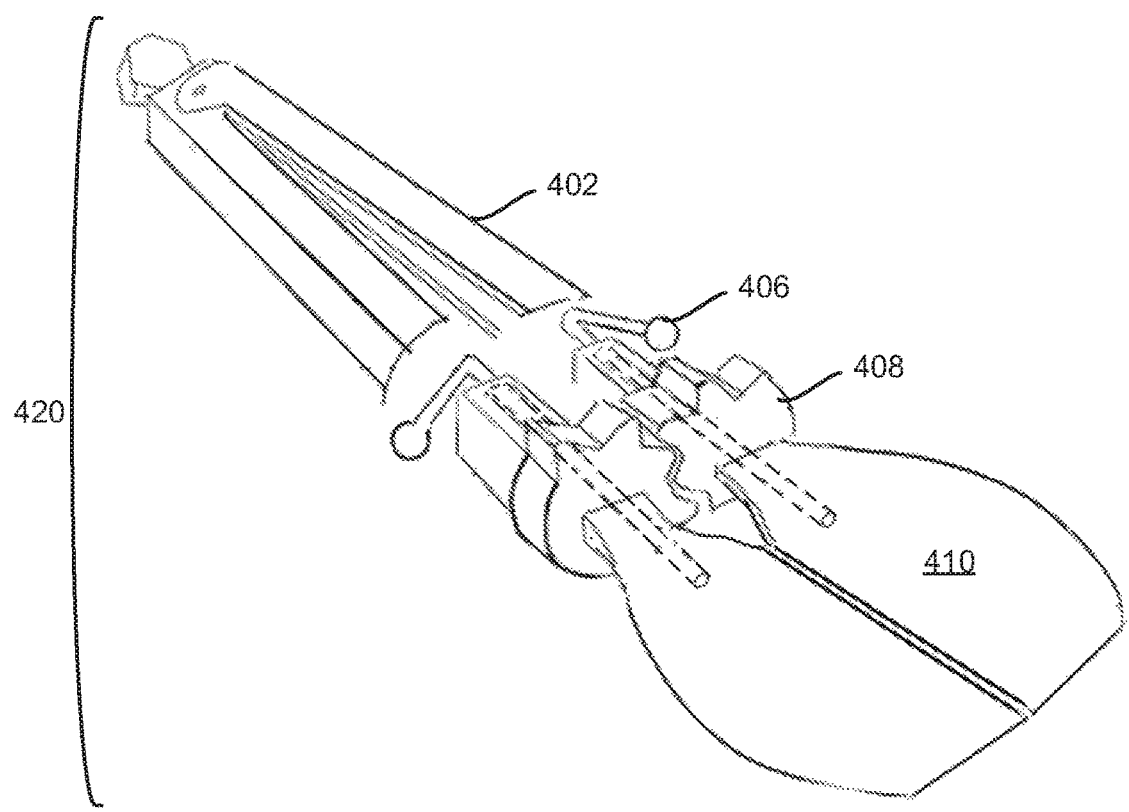

FIG. 4 is an illustrative representation of multi-function tongs in accordance with embodiments of the present invention. In particular, FIG. 4 illustrates multi-function tongs in tong position 400 and spatula position 420. It may be seen that arm 402 forms cavity 404 in which levers 406 are housed. As illustrated, lever 406 is shown housed partially in arm 402 and coupled with both rotatable gear 408 and paddle 410. It may be noted that when multi-function tongs are in the tong position and open, rotatable gears do not mesh (i.e. 400). Only when multi-function tongs are closed do rotatable gears mesh (i.e. 420).

Figure 5:
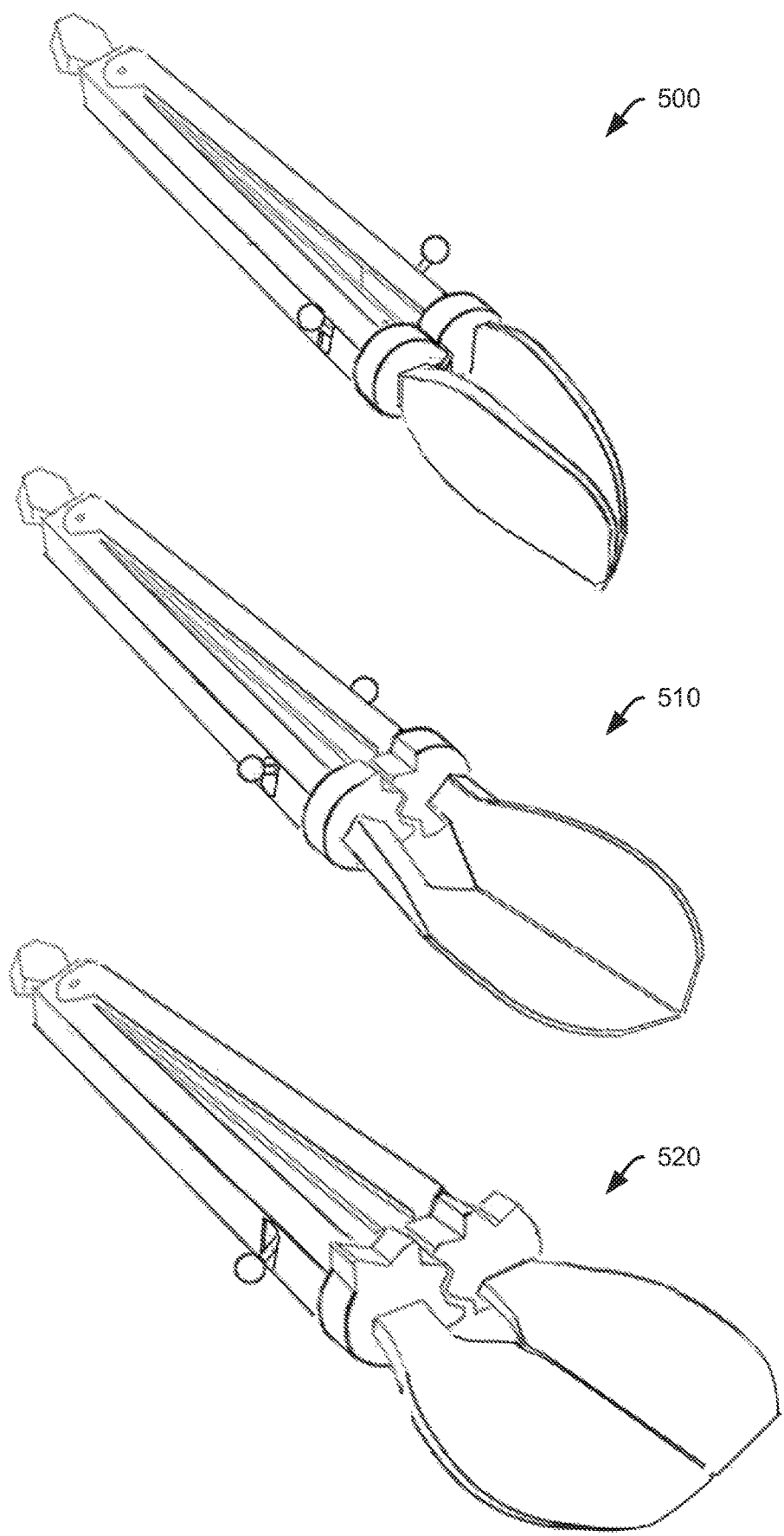
FIG. 5 is an illustrative representation of multi-function tongs in accordance with embodiments of the present invention.

FIG. 5 is an illustrative representation of multi-function tongs in accordance with embodiments of the present invention. In particular, FIG. 5 illustrates multi-function tongs in tong position 500, ladle position 510 which is rotated approximately 45 degrees, and spatula position 520 which is rotated approximately an additional 45 degrees or 90 degrees total. In operation, a user may grasp multi-function tongs with a single hand in the open tong position. The user may then close and lock the tongs and rotate the rotatable paddles to a desired position. The operation may be reversed to return to a tong position.

Figure 6:
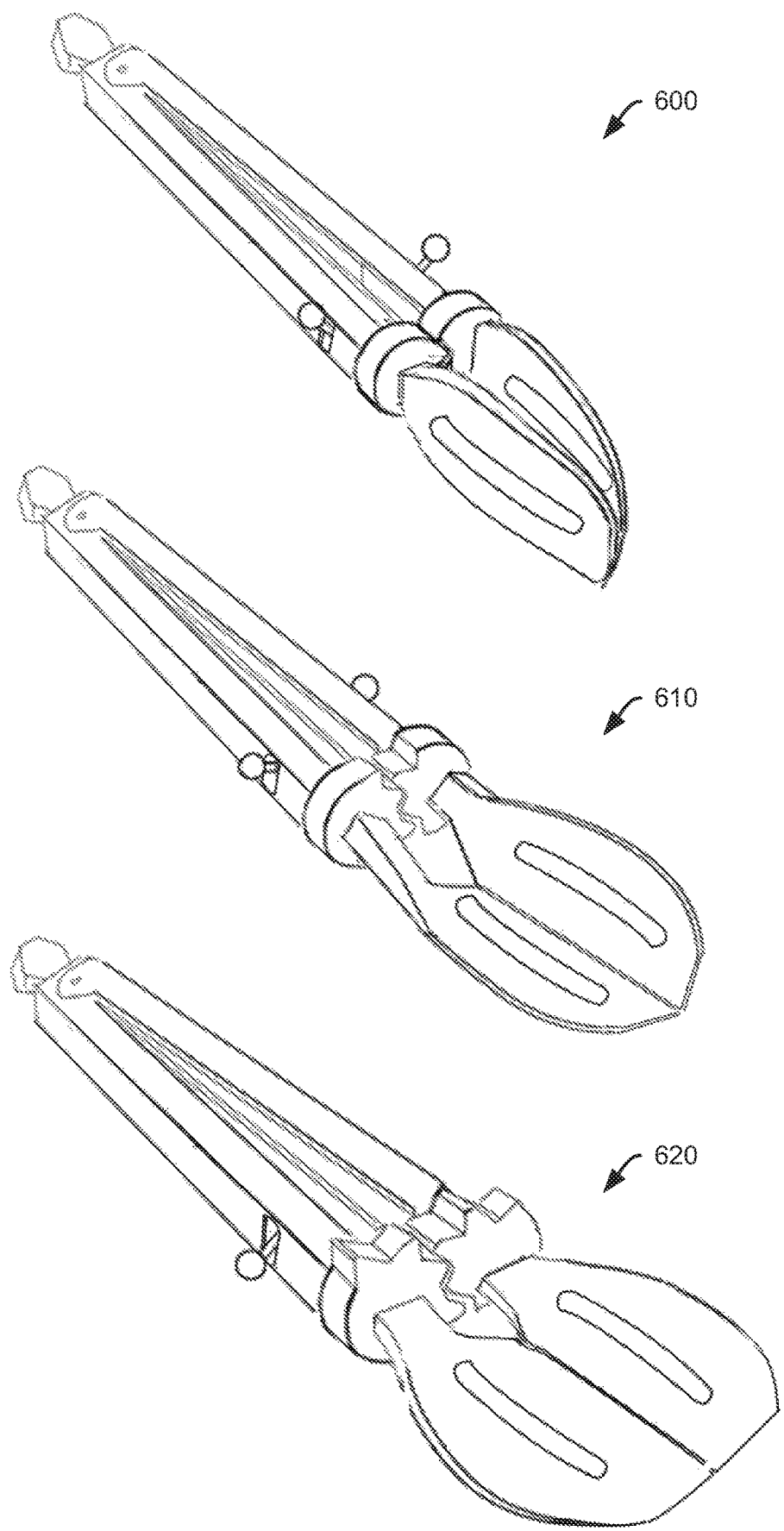
FIG. 6 is an illustrative representation of multi-function tongs in accordance with embodiments of the present invention.

FIG. 6 is an illustrative representation of multi-function tongs in accordance with embodiments of the present invention. In particular, FIG. 6 illustrates multi-function tongs having slotted paddles in tong position 600, ladle position 610 which is rotated approximately 46 degrees, and spatula position 620 which is rotated approximately an additional 45 degrees or 90 degrees total. In operation, a user may grasp multi-function tongs with a single hand in the open tong position. The user may then close and lock the tongs and rotate the rotatable paddles to a desired position. The operation may be reversed to return to a tong position.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A multi-function tongs comprising:
a pair of arms mechanically hinged along a proximal end;
a pair of rotatable paddles each rotatably coupled with each of the pair of arms along a distal end, wherein the pair of rotatable paddles are configured to rotatably affix to any of a position selected from the group consisting of: a tong position, a ladle position, and a spatula position;
a pair of rotatable gears each rotatably coupled with each of the pair of rotatable paddles and with each of the pair of arms, wherein the pair of rotatable gears mesh when the multi-function tongs are in the closed position; and
a pair of levers mechanically coupled with each of the pair of rotatable gears, the pair of levers extending outwardly from each of the pair of arms.

2. The multi-function tongs of claim 1, further comprising:
a tongs lock disposed along the proximal end to lock the multi-function tongs in a closed position.

3. The multi-function tongs of claim 1, further comprising:
a tongs spring disposed along the proximal end to provide opening force to the pair of arms.

4. The multi-function tongs of claim 1, further comprising:
on each of the pair of rotatable gears a plurality of indents each corresponding with the position; and
a pair of pin stops that engage the plurality of indents for each of the pair of rotatable gears.

5. The multi-function tongs of claim 1, wherein the pair of rotatable paddles are slotted.

6. The multi-function tongs of claim 1, wherein the arms form a cavity in which the pair of levers are housed.

7. The multi-function tongs of claim 1, wherein the pair of rotatable gears are manufactured from a polymeric material.

8. The multi-function tongs of claim 1, wherein the rotatable gears comprise:
a toothed portion along an outer edge of the rotatable gear; and
a smooth portion along the outer edge of the rotatable gear.

9. The multi-function tongs of claim 1, wherein the pair of rotatable paddles are lobed along one edge.

10. The multi-function tongs of claim 1, wherein each of the pair of arms further comprise a bend positioned between the proximal end and the rotatable gear.

11. A method of utilizing multi-function tongs comprising:
providing a multi-function tongs, the multi-function tongs comprising:
a pair of arms mechanically hinged along a proximal end,
a pair of rotatable paddles each rotatably coupled with each of the pair of arms along a distal end,
a pair of rotatable gears each rotatably coupled with each of the pair of rotatable paddles and with each of the pair of arms, wherein the pair of rotatable gears mesh when the multi-function tongs are in the closed position, and
a pair of levers mechanically coupled with each of the pair of rotatable gears, the pair of levers extending outwardly from each of the pair of arms,
a tongs lock disposed along the proximal end to lock the multi-function tongs in a closed position, and
a tongs spring disposed along the proximal end to provide opening force to the pair of arms,
closing the multi-function tongs;
locking the multi-function tongs with the tongs lock; and
rotating the multi-function tongs to a ladle position.

12. The method of claim 11, further comprising:
rotating the multi-function tongs to a spatula position.

13. The method of claim 11, wherein further comprising:
rotating the multi-function tongs to a tongs position; and
unlocking the multi-function tongs.

* * * * *